(12) United States Patent
Shima

(10) Patent No.: US 7,256,904 B1
(45) Date of Patent: Aug. 14, 2007

(54) DEVICE FOR DYNAMICALLY VARYING THE PRIORITY OF VARIOUS PROCESSING IN A PRINTER

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/522,407

(22) Filed: Mar. 9, 2000

(30) Foreign Application Priority Data

Mar. 10, 1999 (JP) ................................. 11-063877

(51) Int. Cl.
G06F 15/00 (2006.01)
G06K 15/02 (2006.01)

(52) U.S. Cl. ............... 358/1.15; 358/1.9; 358/1.13; 718/102; 718/103

(58) Field of Classification Search ...... 358/1.13–1.15; 718/1, 100, 102, 103, 107
See application file for complete search history.

(56) References Cited

U.S. PATENT DOCUMENTS 5,247,677 A * 9/1993 Welland et al. ............. 718/103
5,490,237 A * 2/1996 Zimmerman et al. ...... 358/1.16
5,822,500 A * 10/1998 Utsunomiya et al. ........ 358/1.1
6,560,627 B1 * 5/2003 McDonald et al. ......... 718/103

FOREIGN PATENT DOCUMENTS

| EP | 0 782 067 A2 | 7/1997 |
|----|---|---|
| EP | 782067 A2 * | 7/1997 |
| EP | 0 820 032 A2 | 1/1998 |
| EP | 820032 A2 * | 1/1998 |
| JP | 2-70465 | 3/1990 |
| JP | 02-202972 | 8/1990 |
| JP | 06-095814 A | 4/1994 |
| JP | 07-134639 A | 5/1995 |
| JP | 09-071012 A | 3/1997 |
| JP | 9-314929 | 12/1997 |
| JP | 10-065894 A | 3/1998 |
| JP | 10-78857 | 3/1998 |
| JP | 10-173836 | 6/1998 |

* cited by examiner

Primary Examiner—King Y. Poon
(74) Attorney, Agent, or Firm—Sughrue Mion, PLLC

(57) ABSTRACT

An image can be smoothly generated without delaying the release of a host by dynamically changing the priority of a task for writing to a hard disk for the priority of another task. The dynamic varying of the priorities of the different types of tasks is dependent upon predetermined events or triggers, which thereby prevents the release delay of a host, so that successive images can be smoothly generated.

3 Claims, 17 Drawing Sheets

DEVICE FOR DYNAMICALLY VARYING THE PRIORITY OF VARIOUS PROCESSING IN A PRINTER

BACKGROUND OF THE INVENTION

1. Field of the Invention

The present invention relates to a printer, a printer control method and a record medium for recording a program. In more detail, the present invention relates to a printer provided with an auxiliary storage such as a hard disk (HD) separately from a buffer memory, a printer control method and a record medium for recording a program.

The present application is based on Japanese Patent Application No. Hei. 11-63877, which is incorporated herein by reference.

2. Description of the Related Art

A conventional type printer stores print job data from a host computer in a receive buffer, sequentially interprets data stored in the receive buffer, generates image data for printing and output and prints it. As such a printer has only to sequentially interpret and print as described above, a so-called local printer has only to have a memory enough to temporarily store data for one band or one page for example according to the format of its print engine.

However, recently, as the coloring, enhancing the resolution and others of a printed document are promoted as a computer, image processing technology and others develop, the quantity of print job data increases. In the case of a network printing system that plural host computers share a printer via a network such as a local area network (LAN), print job data from plural host computers is required to be successively processed.

If a memory mounted in a printer has only capacity for one page, a host computer which desires a document for a few hundred pages to be printed is required to continue to send print job data for a long time. The other many host computers connected via the network are required to wait for a long time.

A printer provided with an auxiliary storage such as HD inside the printer so that received data is stored in the auxiliary storage so as to store enormous print job data promptly and release a host computer early is proposed recently. In this specification, the above auxiliary storage is not limited to HD, includes various recording devices using a record medium such as an optical record medium and a magneto-optic record medium and means a storage speed for writing and reading data to/from which is slower than a conventional type buffer memory, that is, RAM. At least, the reduction of speed caused by an access of a head to a record medium such as a disk is caused by the above auxiliary storage. For an example of the auxiliary storage, a case using HD will be described below.

As a large quantity of data can be stored in a printer utilizing the above auxiliary storage, a host computer can be released early. However, as data is read or written by moving a head to a predetermined position on a rotated storage medium in HD used for an auxiliary storage, speed for reading or writing data is slower than that in case a memory such as a random access memory (RAM) is accessed. For example, normally, even if speed for receiving data from a network is 1 to 2 MB/second and processing speed in an image data generation section is 1 MB/second, the data transfer rate of HD is approximately 500 kB/second and is slow.

Therefore, in the case of only the transfer of print job data via an auxiliary storage, it takes much time to write and read to/from the auxiliary storage, and thus, printing processing is greatly delayed. In this case, if a high speed interface, DMA and others are adopted, the data transfer rate of an auxiliary storage is enhance, however, the cost of a printer is increased.

In the meantime, if printing processing is preceded and processing for writing and reading to/from an auxiliary storage is left until later, speed for receiving from a network is greatly reduced and the release of a host computer is delayed.

SUMMARY OF THE INVENTION

The present invention is made in view of such problems. That is, the object is to provide a printer wherein prompt printing processing and the prompt release of a host computer are compatible by dynamically varying the priority of various processing required for printing processing in the printer, a printer control method and a record medium for recording a program.

To achieve the above object, a printer according to the present invention is based upon a printer provided with an auxiliary storage and is characterized in that a printing task for executing processing related to the control of a print engine based upon a request for printing, an image generation task for generating the above request for printing based upon print data sent from an external device, a task for writing to an auxiliary storage that data related to printing is stored in the auxiliary storage and a task for reading from the auxiliary storage that the above data stored in the auxiliary storage is read are exclusively selected and executed according to each priority, and further the relative order of priority based upon the priority of the above task for writing to the auxiliary storage and the priority of the above image generation task is varied when a predetermined event occurs.

If the order of priority is varied as described above, CPU can be allocated to each task in a well-balanced state and efficient processing is enabled as the whole printer.

A print engine can be smoothly operated by applying lower priority than the priority of the above printing task to the above task for writing to the auxiliary storage and the above task for reading from the auxiliary storage and particularly, if an engine of a laser printer is used, extremely prompt printing is also enabled.

It is desirable that the above predetermined event occurs when predetermined time elapses. That is, priority is varied by a method such as timer interrupt and efficient processing is extremely easily realized.

Or the above predetermined event may be also the occurrence of a predetermined situation which occurs in the processing of any task. That is, according to a situation under which a task is processed, CPU can be efficiently allocated to each task that determines the rate of the whole processing.

Further, the above predetermined event may be also made to occur according to the quantity of requests for printing generated by the above image generation task and stored to be processed by the above printing task. If so, data can be efficiently written to the auxiliary storage, continuously operating the print engine and a host computer can be released early.

Further, priority lower than the priority of the above task for reading from the auxiliary storage may be also applied to the above task for writing to the auxiliary storage. If so, data can be written to the auxiliary storage without limiting the rate of reading processing.

Further, a printer according to the present invention is based upon a printer provided with an auxiliary storage for storing data related to printing, a print engine for executing printing and a controller and is characterized in that the above controller comprises writing means for storing data to an auxiliary storage, reading means for reading the data stored in the auxiliary storage, image generation means for generating a request for printing supplied to a print engine and printing execution means for controlling the print engine and if a predetermined event occurs during processing for generating the request for printing by the above image generation means, the writing means is executed more precedently than the generation of the request for printing by the image generation means, and prompt printing and the early release of a host computer are compatible.

If data related to printing stored in the auxiliary storage in any of the above printers includes print data sent from an external device, print data received via a network can be stored in large quantity and a host computer can be released early.

Or if data related to printing stored in the auxiliary storage includes at least a part of the above request for printing, a large quantity of image data to be transferred to the print engine and others are stored and continuous printing operation is enabled.

In the meantime, a printer control method according to the present invention comprises a writing process for storing print data received from an external device in the auxiliary storage, a reading process for reading print data written to the auxiliary storage, a generation process for generating a request for printing based upon the read print data and a printing process for printing based upon the above request for printing, and the above writing process is controlled so that it is periodically executed by CPU even while the above generation process is executed by CPU. That is, priority is varied by a method such as timer interrupt and efficient processing is extremely easily realized.

Further, a printer control method according to the present invention comprises a writing process for storing print data received from an external device in the auxiliary storage, a reading process for reading print data written to the auxiliary storage, a generation process for generating a request for printing based upon the read print data and a printing process for printing based upon the above request for printing, and the above writing process is controlled so that it is precedently executed by CPU in case the stored quantity of the requests for printing generated by executing the above generation process by CPU is equal to predetermined quantity. That is, according to a situation under which a task is processed, CPU can be efficiently allocated to each task that determines the rate of the whole processing.

In the meantime, a medium that records a program according to the present invention is based upon a record medium that records a program for operating the printer provided with the auxiliary storage and the print engine by exclusively selecting and executing any of plural tasks according to priority, and is characterized in that the medium that records a program according to the present invention is a record medium that records a program comprising a writing task for storing data in the auxiliary storage, a reading task for reading data stored in the auxiliary storage, an image generation task for generating a request for printing supplied to the print engine and a printing task for controlling the print engine and controlling so that the above printing task is most precedently executed, the print engine can be smoothly operated and particularly, if an engine of a laser printer is used, extremely prompt printing is also enabled.

Still further, a medium that records a program according to the present invention is based upon a record medium that records a program for operating a printer provided with an auxiliary storage and a print engine by exclusively selecting and executing any of plural tasks according to priority, and is characterized in that the medium that records a program according to the present invention is a record medium that records a program comprising a writing task for storing data in the auxiliary storage, a reading task for reading data stored in the auxiliary storage, an image generation task for generating a request for printing supplied to the print engine and a printing task for controlling the print engine and controlling so that priority according to which the above writing task and the above image generation task are executed is varied according to a predetermined condition, CPU can be allocated to each task in a well-balanced state and efficient processing is enabled as the whole printer.

The above record medium also includes a memory such as RAM and ROM in addition to a hard disk (HD), DVD-RAM, DVD-ROM a flexible disk (FD) and CD-ROM.

A program to be recorded on these media may be also sold with the program enciphered, with the program modulated or with the program compressed via a wire circuit such as the Internet and a radio link or in a state in which the program is stored on a record medium.

Features and advantages of the invention will be evident from the following detailed description of the preferred embodiments described in conjunction with the attached drawings.

DETAILED DESCRIPTION OF THE PREFERRED EMBODIMENTS

Figure 1:
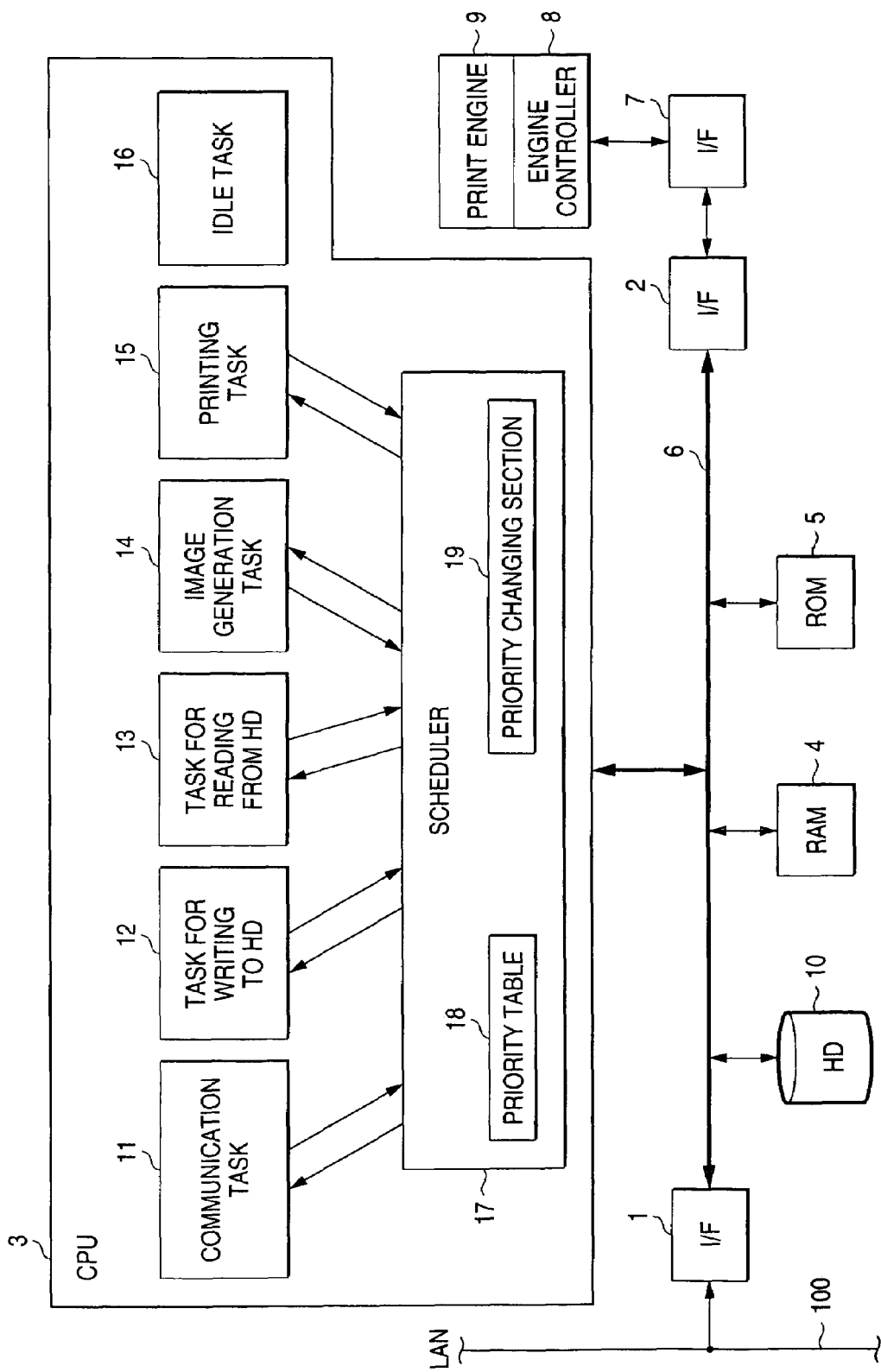
FIG. 1 is an explanatory drawing schematically showing the configuration of a printer equivalent to an embodiment of the present invention.

Referring to the drawings, embodiments of the present invention will be described below.

First Embodiment

FIG. 1 is an explanatory drawing schematically showing the configuration of a printer equivalent to an embodiment of the present invention. A printer is provided with interfaces 1 and 2, CPU 3, RAM 4, ROM 5, an engine controller 8, a print engine 9 and an auxiliary storage 10. A case using HD for an example of the auxiliary storage 10 will be described below.

The interfaces 1 and 2, CPU 3, RAM 4, ROM 5 and HD 10 are connected via a bus 6 and the engine controller 8 is connected to the bus 6 via the interfaces 2 and 7. CPU 3 communicates data with an external network 100 such as LAN via the interface 1 and communicates data with the engine controller 8 via the interface 2.

CPU 3 acts as an arithmetic processing unit and exclusively selects and executes any of plural tasks (also called processes). That is, CPU 3 exclusively selects and executes any of a communication task 11, a task for writing to HD 12, a task for reading from HD 13, an image generation task 14 and a printing task 15 as shown in FIG. 1. In addition to these typical tasks, various tasks not shown such as an idle task for realizing an idle state of a printer and a control task for executing error processing are provided.

The switching of tasks, that is, to which task CPU is allocated is controlled by a scheduler 17 which can be represented as a switching control section. The scheduler 17 is provided with a priority table 18 and a priority changing section 19 for changing the priority of each task. In the priority table 18, data corresponding to the priority of each task 11 to 15 is stored. The priority changing section 19 fills a role of suitably changing the priority of each task and rewriting data in the priority table 18 as described in detail later. The scheduler 17 allocates CPU to any of each task 11 to 15 according to priority stored in the priority table 18.

More concretely, each task including the printing task and the communication task is placed in an execution queue using a preset event as a trigger and is sequentially executed after it is scheduled according to priority. That is, these tasks become executable when an event occurs and a task the priority of which is the highest of executable tasks is executed by CPU 3. For the above event, there are external interruption, timer interrupt and others.

The communication task 11 acts as a communications processor unit and when a packet is set from the network 100, the unit is activated via CPU. The communication task 11 deletes extra data such as an IP address from the received packet and extracts print data. The print data is stored until a predetermined memory block provided to RAM 4 is filled. The communication task 11 is dormant when the storage of the print data is finished. As described later, a memory block in which data is stored is passed to the task for writing to HD 12. The communication task 11 can be composed of plural tasks corresponding to each protocol such as a file transfer protocol (FTP) and a line printer protocol (LPP).

The task for writing to HD 12 acts as a processor for writing to HD and writes data input from the communication task 11 via the memory block of RAM 4 to HD 10 as described later.

The task for reading from HD 13 acts as a processor for reading from HD, reads data stored in HD 10, stores it in a memory block provided to RAM 4 and transfers it to the image generation task 14.

The image generation task 14 acts as a print image generator and is activated when a memory block in which data is stored is passed. The image generation task 14 reads print data in the memory block of RAM 4, generates a request for printing and passes the generated request for printing to the printing task 15. When all print data is read, the image generation task is dormant.

A request for printing is also called printing request structure and includes the specification of paper size, of the number of copies (the number of printed copies) and of whether a printed place is the surface or the back of paper and the information of all image data and others included in the page. That is, all the information of paper and images respectively required for printing the page is acquired by analyzing a request for printing.

The image generation task 14 is not composed of tasks respectively corresponding to plural printing languages but can be a single task corresponding to one printing language. Normally, one print job is described by one type of printing language and when a print job is switched, a task in printing language corresponding to the print job has only to be activated. As described above, a print job can be promptly processed by composing the image generation task 14 by a task in single printing language.

However, the image generation task 14 is not limited to this and may be also composed of plural tasks. In the case of printing language requiring high-grade processing such as a trade name "PostScript", if a request for printing is generated by the cooperative operation of plural tasks, the efficiency of processing is more enhanced.

The printing task 15 acts as a printing executing section. That is, the printing task is activated when a request for printing is input from the image generation task 14, reads image data included in the request for printing and drives the engine controller 8. The engine controller 8 drives the print engine 9 and prints. When the engine controller finishes all printing control processing based upon the request for printing, it becomes sleeping.

The idle task 16 is a task executed for waiting for an event. The lowest priority is applied to the idle task and if no task described above is executed, the idle task is executed. For example, immediately after the printer is powered on or after printing is finished, the idle task is executed.

The print engine 9 includes a paper feeding mechanism, a print head and others and executes printing on a print medium such as paper. Concretely, various engines respectively corresponding to a page printer for printing in units of page, a serial printer for executing printing every predetermined bandwidth, a line printer for printing every line and others can be used.

For an example of a page printer, a so-called laser printer which is provided with a laser beam source or an LED light source and which can execute printing by electrophotography via a photoconductive drum can be given. For an example of a serial printer, a so-called ink-jet printer and a so-called thermal printer can be given. The engine controller 8 and the print engine 9 can be respectively also represented as printing means and a printing mechanism or a printing section.

Figure 2:
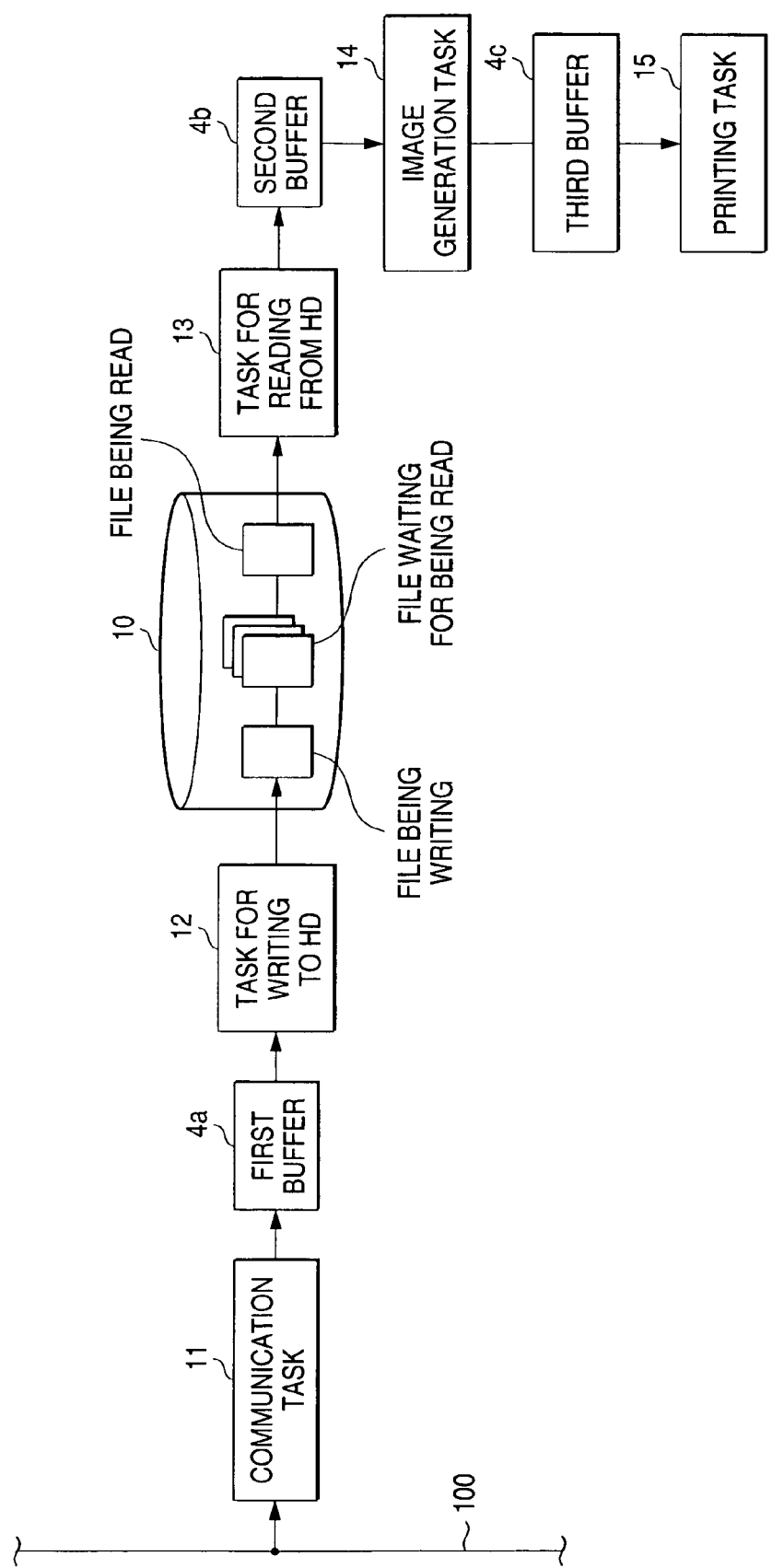
FIG. 2 is a schematic diagram showing the flow of data inside the printer equivalent to the first embodiment of the present invention.

FIG. 2 is a schematic diagram showing the flow of data inside the printer equivalent to this embodiment. That is, the configuration shown in FIG. 2 is equivalent to an example that HD 10 is provided between the communication task 11 and the image generation task 14. Data transfer between the communication task 11 and the task for writing to HD 12 is performed via a first buffer memory 4a and data transfer between the task for reading from HD 13 and the image generation task 14 is performed via a second buffer memory 4b. In HD 10, three types of files of a file data in which is being written by the task for writing to HD 12, a file already written and waiting for processing and a file data in which is read by the task for reading from HD 13 may exist. These three types of files are equivalent to data being processed or residual data.

Figure 3:
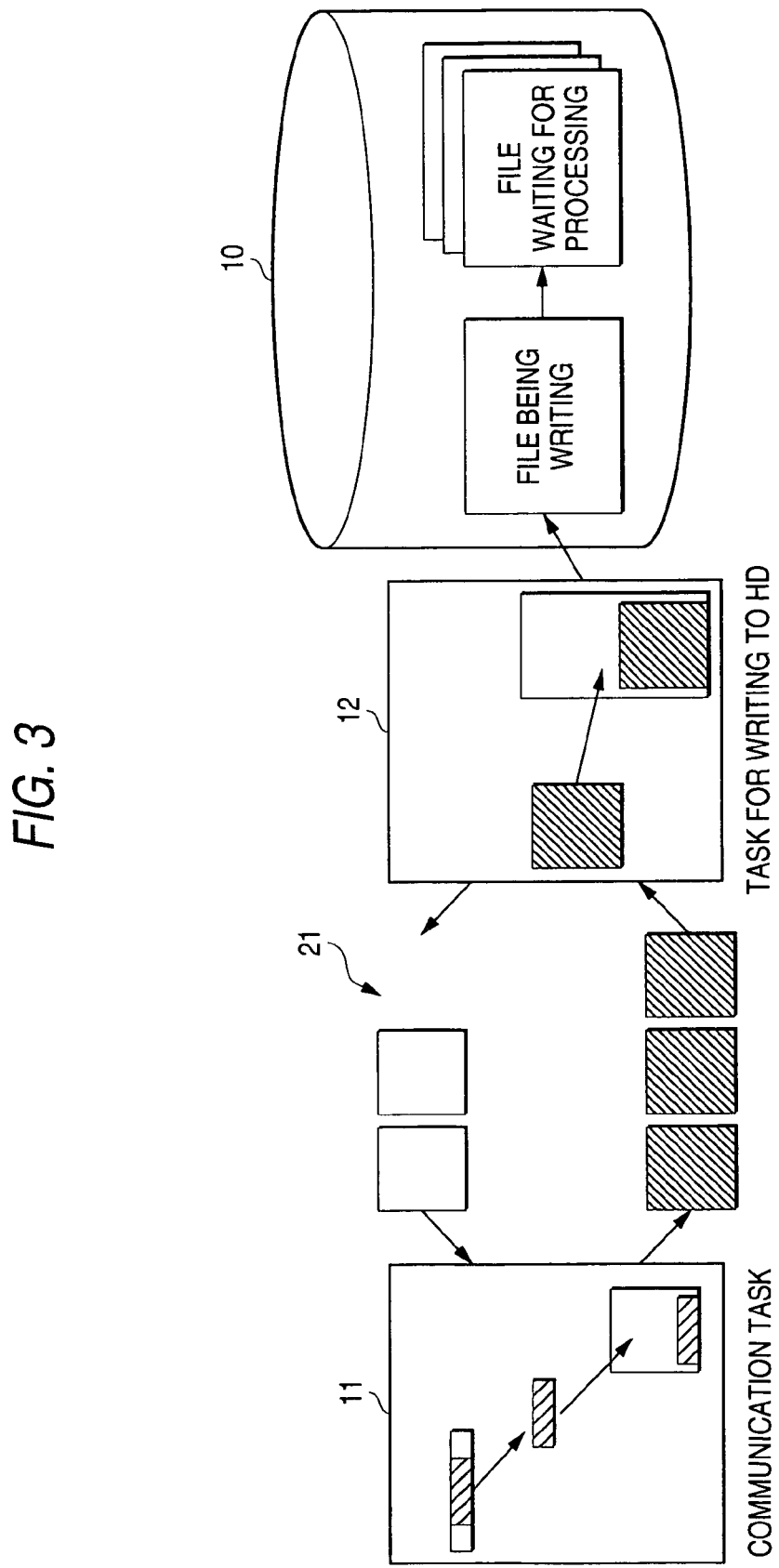
FIG. 3 is a schematic diagram showing the flow of data from a communication task to HD further in detail.

FIG. 3 is a schematic diagram showing the flow of data from the communication task 11 to HD 10 further in detail. That is, the communication task 11 deletes extra data such as header information from a received packet and stores data until an empty memory block of the first buffer memory 4a is filled. The task for writing to HD 12 extracts data from a memory block 21 when the memory block 21 not empty is received and writes data to an empty file inside HD 10. The memory block 21 from which data is extracted is returned to the first buffer memory 4a.

Figure 4:
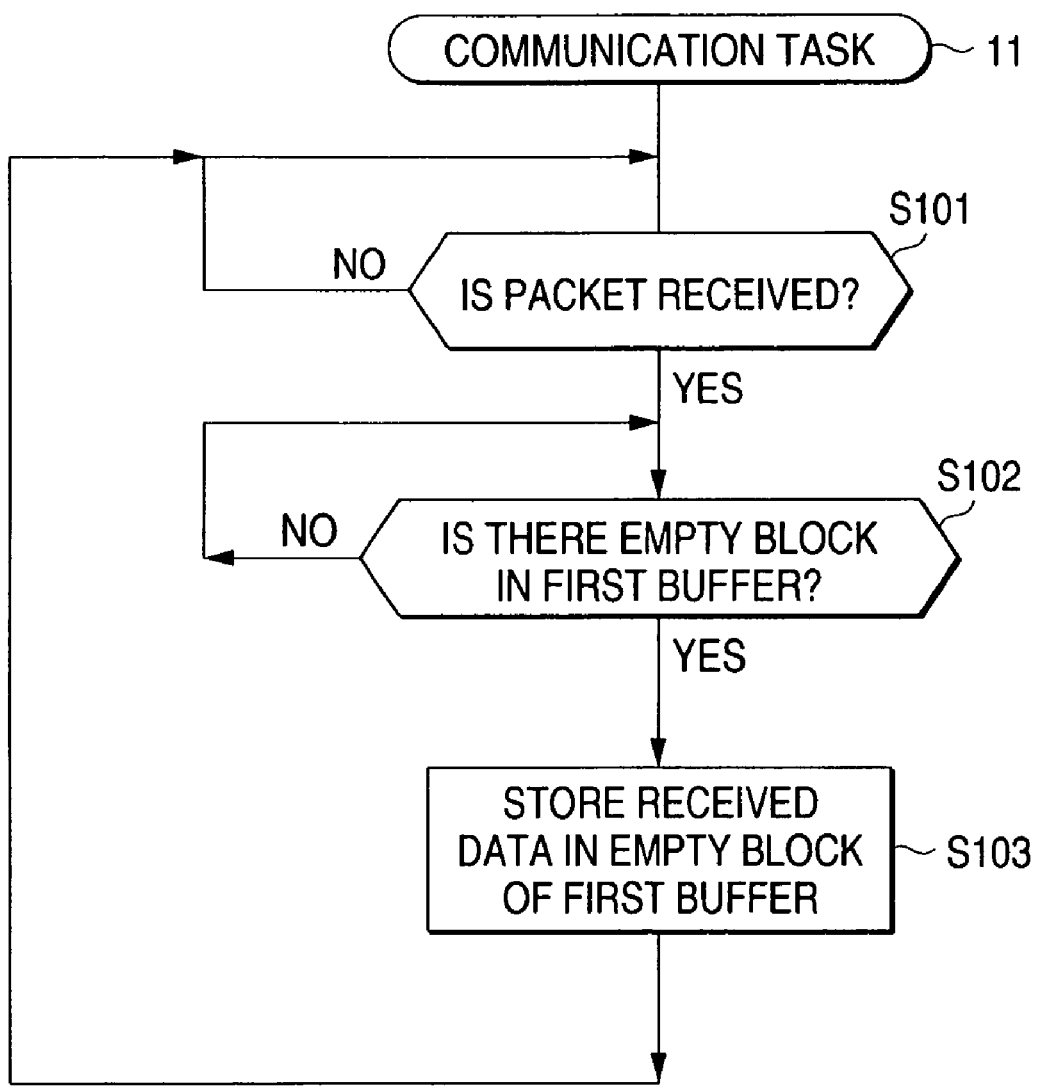
FIG. 4 is a flowchart showing processing by the communication task in the configuration shown in FIG. 3.

FIG. 4 is a flowchart showing processing by the communication task 11 in the configuration shown in FIG. 3. The communication task 11 is activated in the step S101 when packet data is received from the network 100. Next, in a step S102, it is checked whether an empty memory block 21 exists in the first buffer memory 4a or not. If an empty memory block 21 exists in the step S102, one empty memory block 21 is extracted from the first buffer memory 4a and data is stored in the memory block 21 in a step S103. If no empty memory block 21 exists in the first buffer memory 4a, processing is returned to the step S102 because no data can be stored. When data is stored in the first buffer memory 4a in the step S103, processing is returned to the step S101 and waits.

Figure 5:
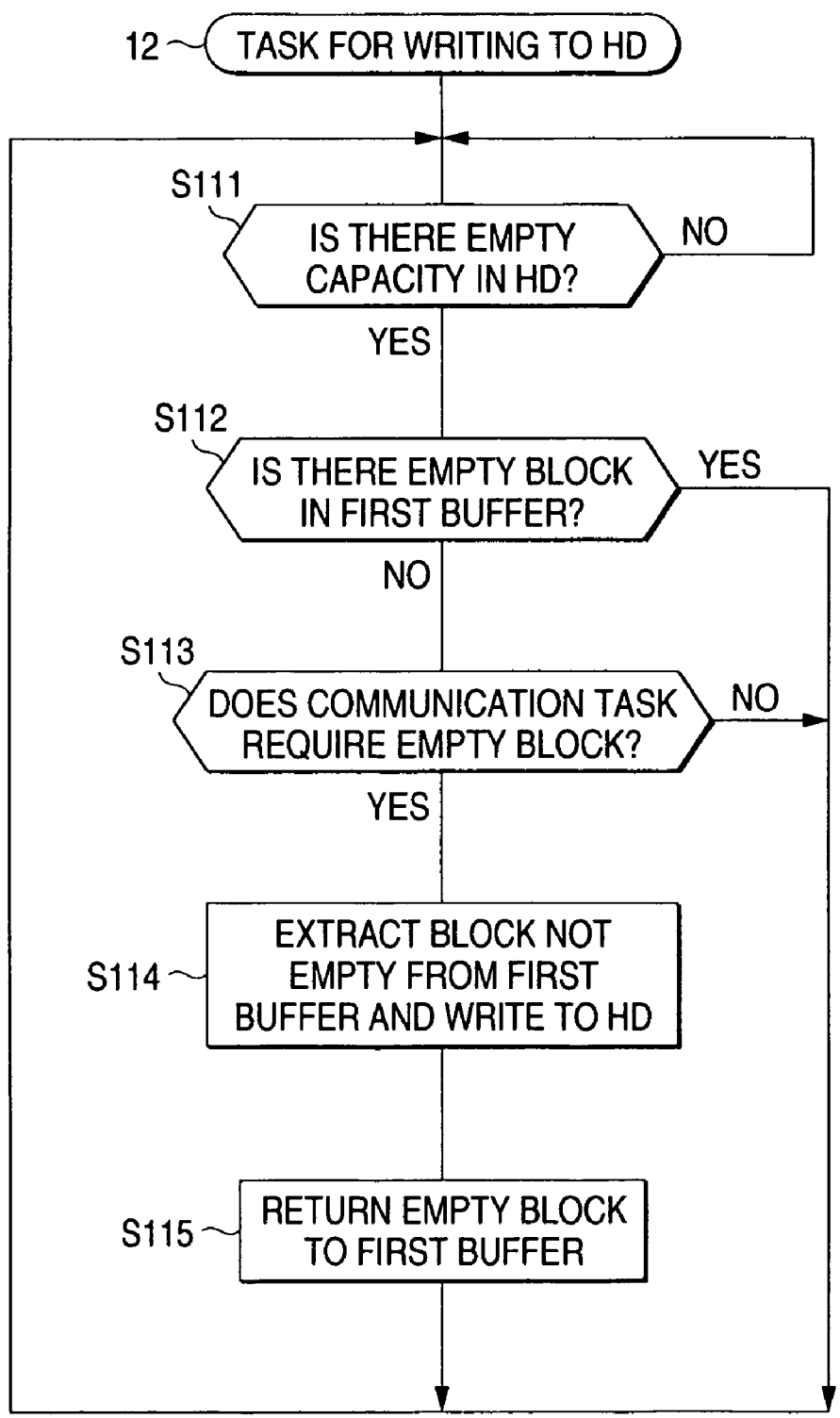
FIG. 5 is a flowchart showing the processing of a task for writing to HD.

Next, FIG. 5 is a flowchart showing the processing of the task for writing to HD 12. First, it is checked whether empty capacity exists in HD 10 or not in a step S111. If empty capacity exists in HD 10, data can be transferred to HD 10. If it is checked in a step S112 whether an empty memory block 21 exists in the first buffer memory 4a or not and it is checked in a step S113 whether the communication task 11 receives the next print job and requires an empty memory block 21 or not. If no empty memory block 21 exists in the first buffer memory 4a and the communication task 11 requires a new empty memory block 21, data is extracted form a memory block 21 not empty and a file is written to HD 10 in a step S114 to generate an empty memory block 21. The memory block 21 from which data is extracted is returned to the first buffer memory 4a in a step S115. Hereby, the communication task 11 can store packet data newly received in the memory block 21.

If no empty capacity exists in HD 10 in the step S111, processing waits because no data can be transferred to HD 10.

Figure 6:
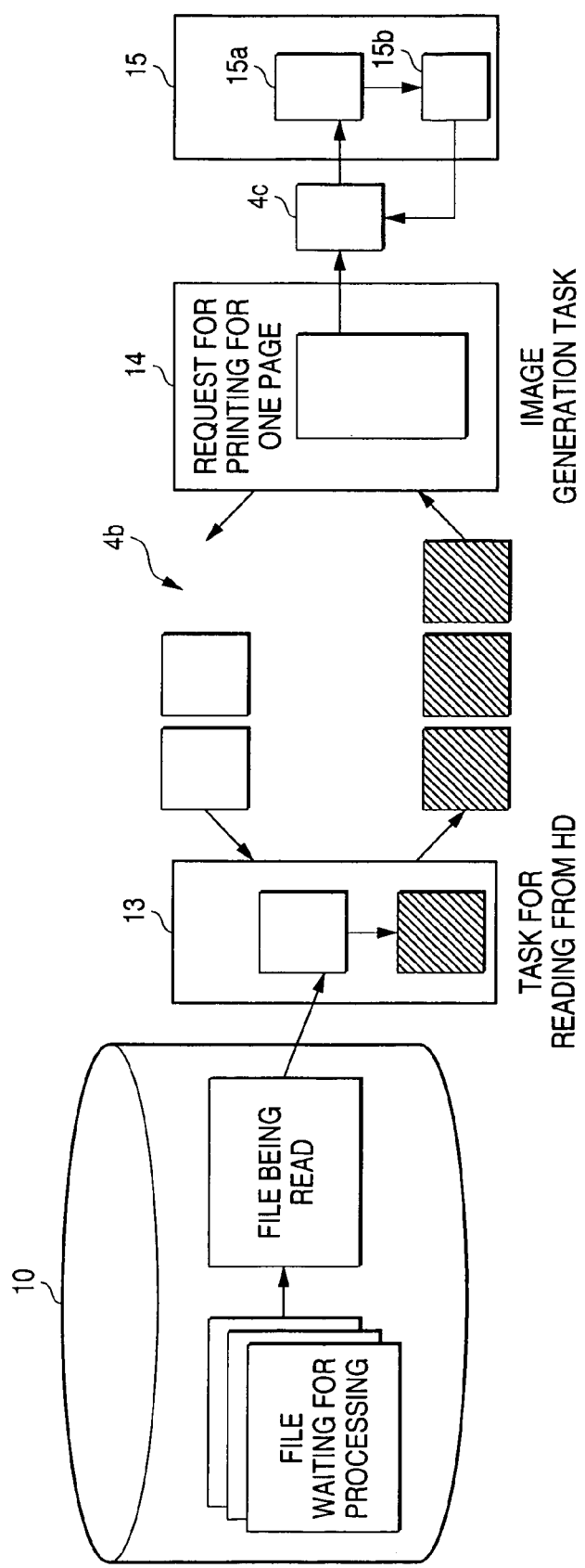
FIG. 6 is a schematic diagram showing the flow of data from HD to a printing task further in detail.

FIG. 6 is a schematic diagram showing the flow of data from HD 10 to the printing task 15 in detail. That is, the task for reading from HD 13 reads data from a file in HD 10 and stores the data until an empty block of the second buffer memory 4b is filled. When the image generation task 14 receives a memory block not empty, it extracts data from the memory block, generates a request for printing and returns the empty memory block from which the data is extracted. The request for printing generated by the image generation task 14 is stored in a buffer 4c between the image generation task and the printing task 15.

A print engine control section 15a and a buffer control section 15b are provided to the printing task 15. The print engine control section 15a reads the request for printing stored in the buffer 4c and drives the engine controller 8 based upon the request for printing to execute printing. The buffer control section 15b controls the buffer 4c. When printing based upon the supplied request for printing is finished, the print engine control section 15a informs the buffer control section 15b of it and the buffer control section 15b clears the request for printing stored in the buffer 4c.

Figure 7:
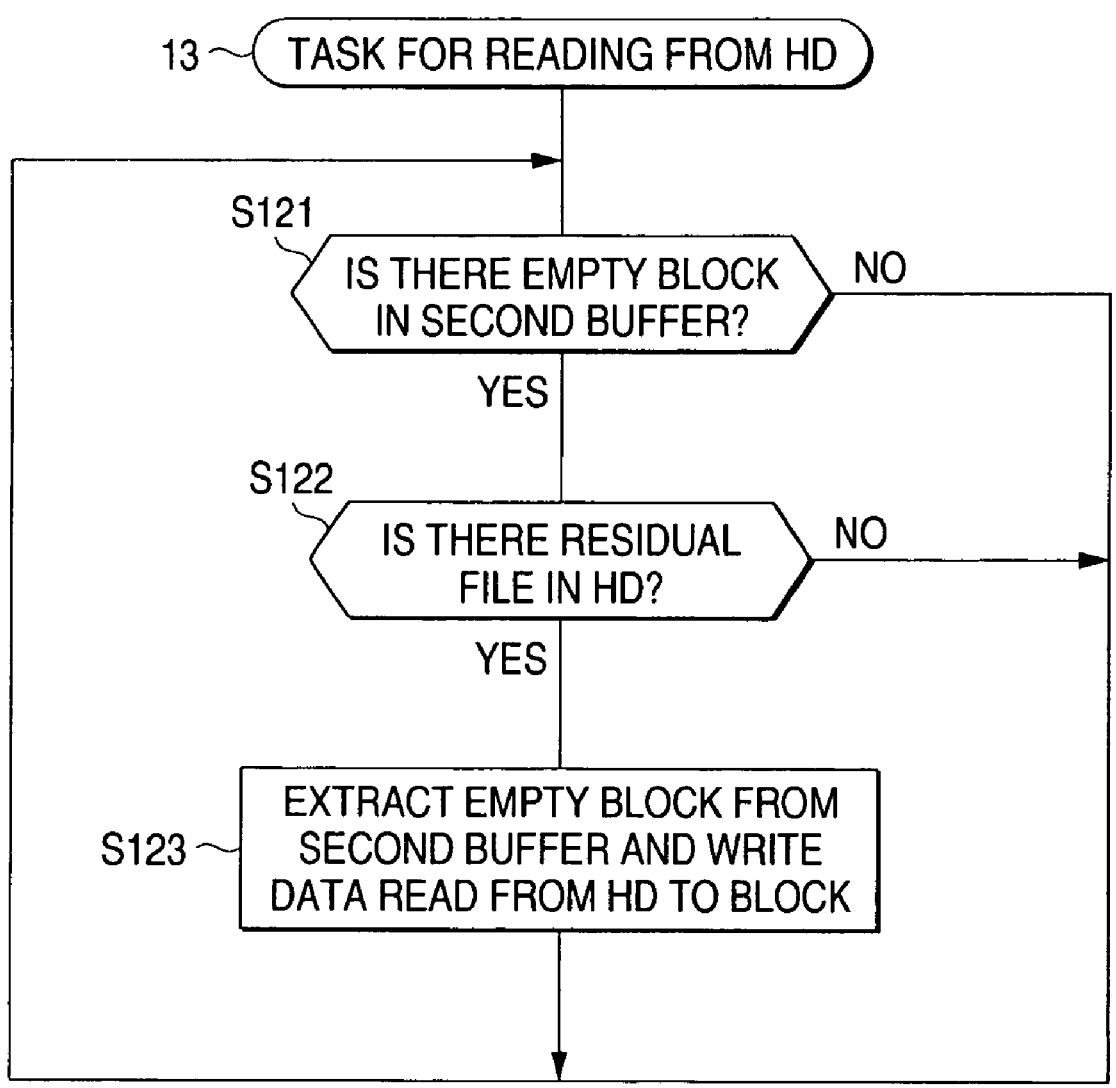
FIG. 7 is a flowchart showing the processing of a task for reading from HD.

FIG. 7 is a flowchart showing the processing of the task for reading from HD 13. First, it is checked in a step S121 whether an empty memory block exists in the second buffer memory 4b or not. Next, it is checked in a step S122 whether a residual file exists in HD 10 or not. If no empty memory block exists in the second buffer memory (NO in the step S121) or if no file to be read exists in HD 10 (NO in the step S122), processing is returned to the step S121 and waits because no data can be transferred. In the meantime, if the steps S121 and S122 are judged as YES, an empty memory block in the second buffer memory 4b is extracted and data read from a file in HD 10 is written to the memory block in a step S123.

Figure 8:
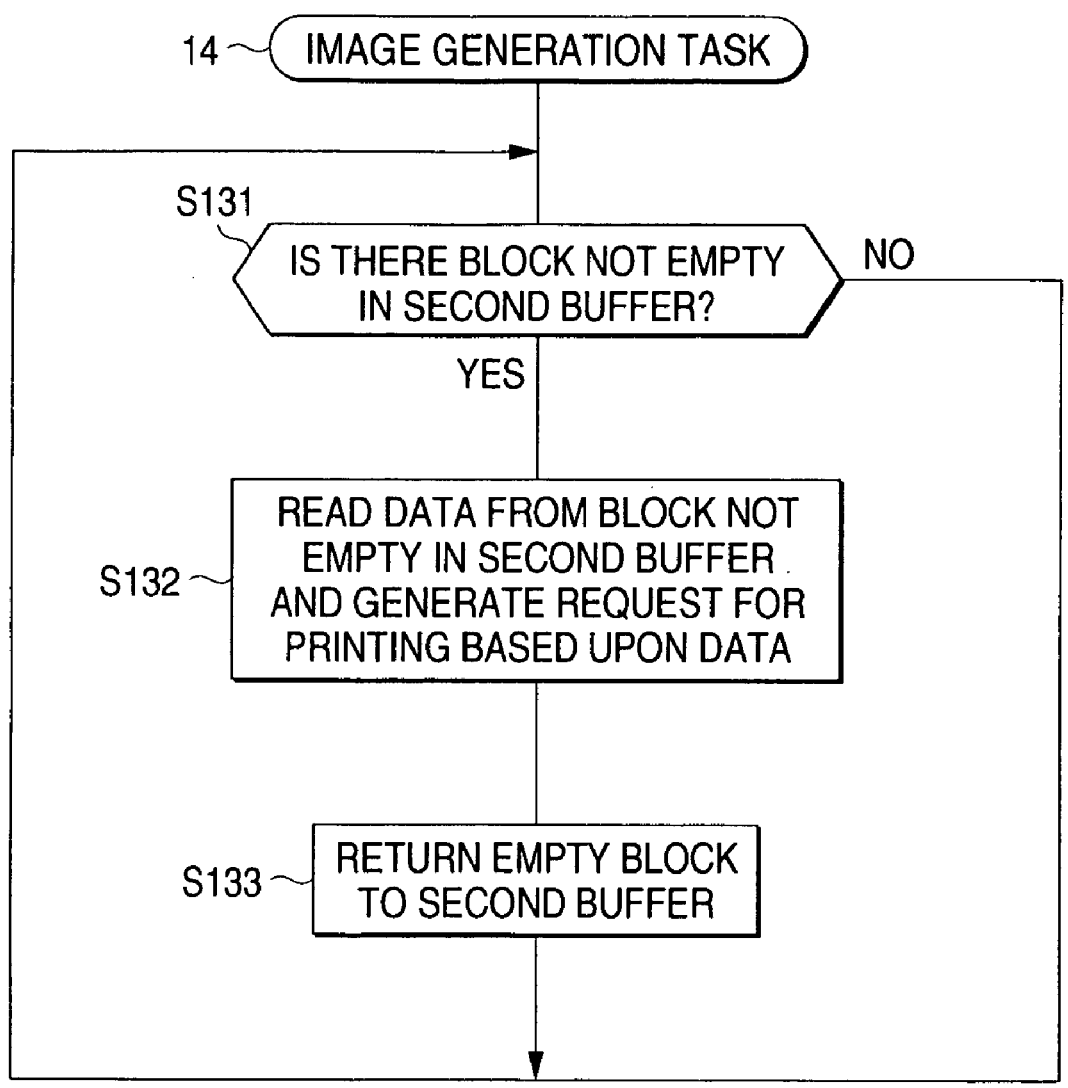
FIG. 8 is a flowchart showing the processing of an image generation task.

Next, FIG. 8 is a flowchart showing the processing of the image generation task 14. First, it is determined in a step S131 whether a memory block not empty exists in the second buffer memory 4b or not. If a memory block not empty exists in the second buffer memory 4b (YES in S131), one memory block not empty is extracted from the second buffer memory 4b, data is read and a request for printing is generated in a step S132. The memory block from which the data is extracted is returned to the second buffer memory in a step S133.

If a resource which a task requires cannot be secured even if the above each task is executable by CPU 3, CPU 3 is allocated to another executable task. For example, in the communication task, a case that no packet destined for the communication task is sent from a network (packets having various destinations flow in a network and a packet destined for the communication task often intermittently arrives) and a case that there is no memory block for storing a received packet can be given.

Also, in the printing task, a case that no request for printing to be processed exists and a case that a work memory becomes full can be given. Further, in the case of the printing task, a case that a part printed by the print engine becomes a part where no image data exists and no data to be processed exists and a case that printing becomes a waiting state by a part of a margin of paper and paper feeding timing can be also given.

In the present invention, the above each task is executed according to each priority and if a predetermined event occurs, the priority of a specific task is changed. That is, priority is allocated to each task and each task is executed according to the priority. If a predetermined event occurs while a certain task is executed, the priority of the task for writing to HD 12 and the task for reading from HD 13 is relatively enhanced and each task is executed even if either of the task for writing to HD 12 or the task for reading from HD 13 has low priority corresponding to the above event.

Figure 9:
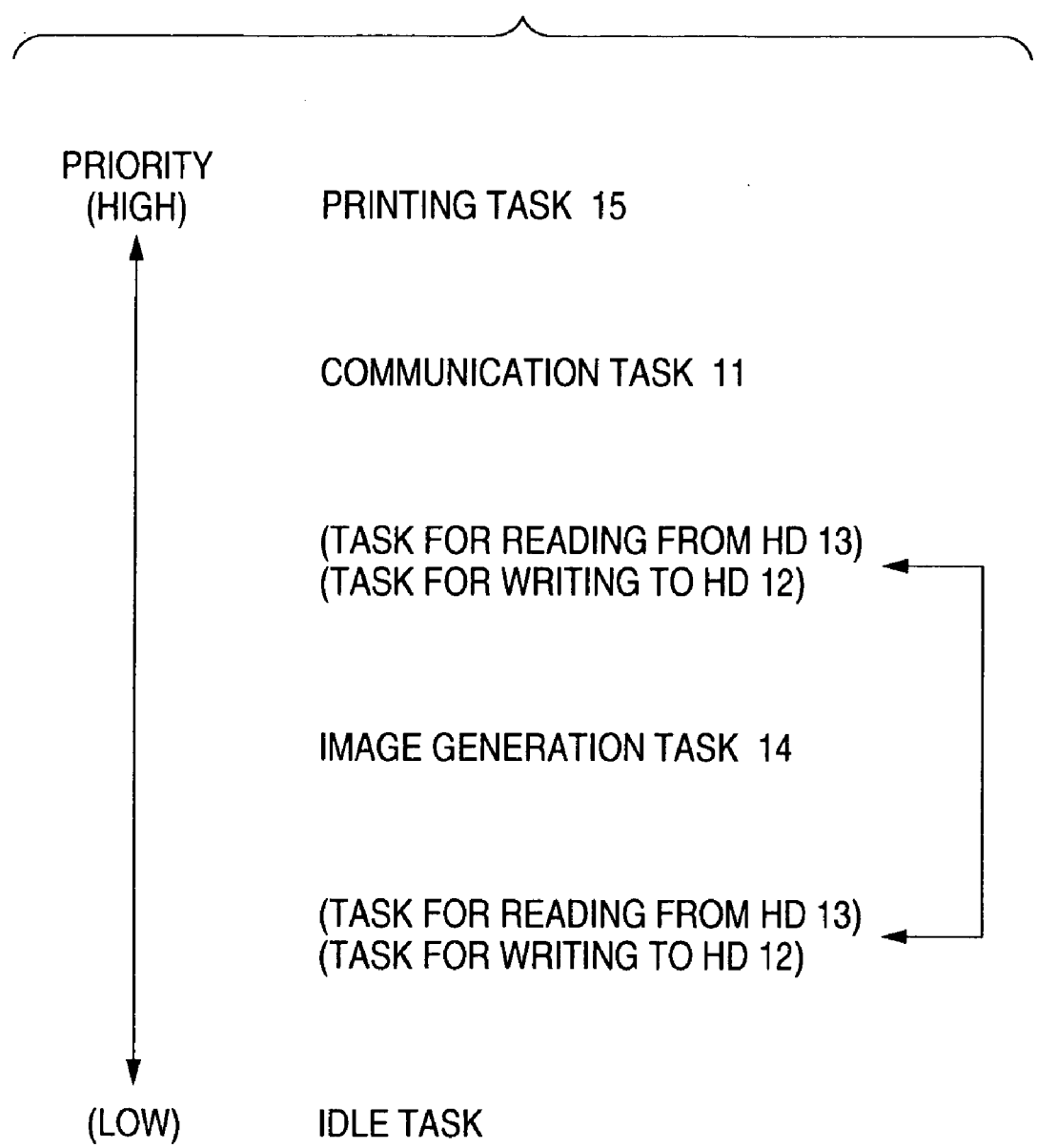
FIG. 9 is a conceptual drawing showing relationship among the priority of each task in the printer according to the present invention.

FIG. 9 is a conceptual drawing showing an example of relationship among the priority of each task in the printer according to the present invention. That is, FIG. 9 shows a case of a laser printer, and the priority of a communication task 11 is set so that it is higher than that of an image generation task 14 and the priority of the communication task 11 is lower than that of a printing task 15. Therefore, if a packet is received during the generation of a request for printing, the communication task 11 is executed prior to the image generation task, however, during the execution of the printing task 15, the communication task 11 is not executed even if a packet is received from the network 100.

In the meantime, in the present invention, the priority of the task for writing to HD 12 and the priority of the task for reading from HD 13 are dynamically changed. Specifically, the priority of the task for writing to HD 12 and the task for reading from HD 13 and the priority of the image generation task are reversed every predetermined time interval.

The above change of priority is executed by the priority changing section 19 shown in FIG. 1. That is, if a predetermined event occurs, the priority changing section 19 rewrites the priority of predetermined tasks stored in the priority table 18. The above change of priority can be performed by instructing the scheduler 17 of CPU 3 to execute timer interrupt processing for example. Or the priority of tasks having higher priority in which CPU is allocated may be periodically also changed.

A reason why the priority of the printing task 15 is set so that it is the highest as shown in FIG. 9 is that in the laser printer, when the print engine is intermittently operated, the loss of rise time occurs and it is the most efficient processing to continuously operate the print engine. The above will be described in detail later.

In the meantime, in the case of a so-called serial printer such as an ink-jet printer, even if a print engine is intermittently operated, no loss of rise time occurs. Therefore, the priority of a printing task 15 is not necessarily required to be uppermost.

That is, the major object of the present invention is to dynamically change the priority of the task for writing to HD so that it is higher than the priority of any other task. Therefore, it is desirable that the priority of the printing task, the communication task and the image generation task is suitably changed according to the format of a printer.

A case that the priority of the task for writing to HD and the image generation task is changed will be described below.

Figure 10:
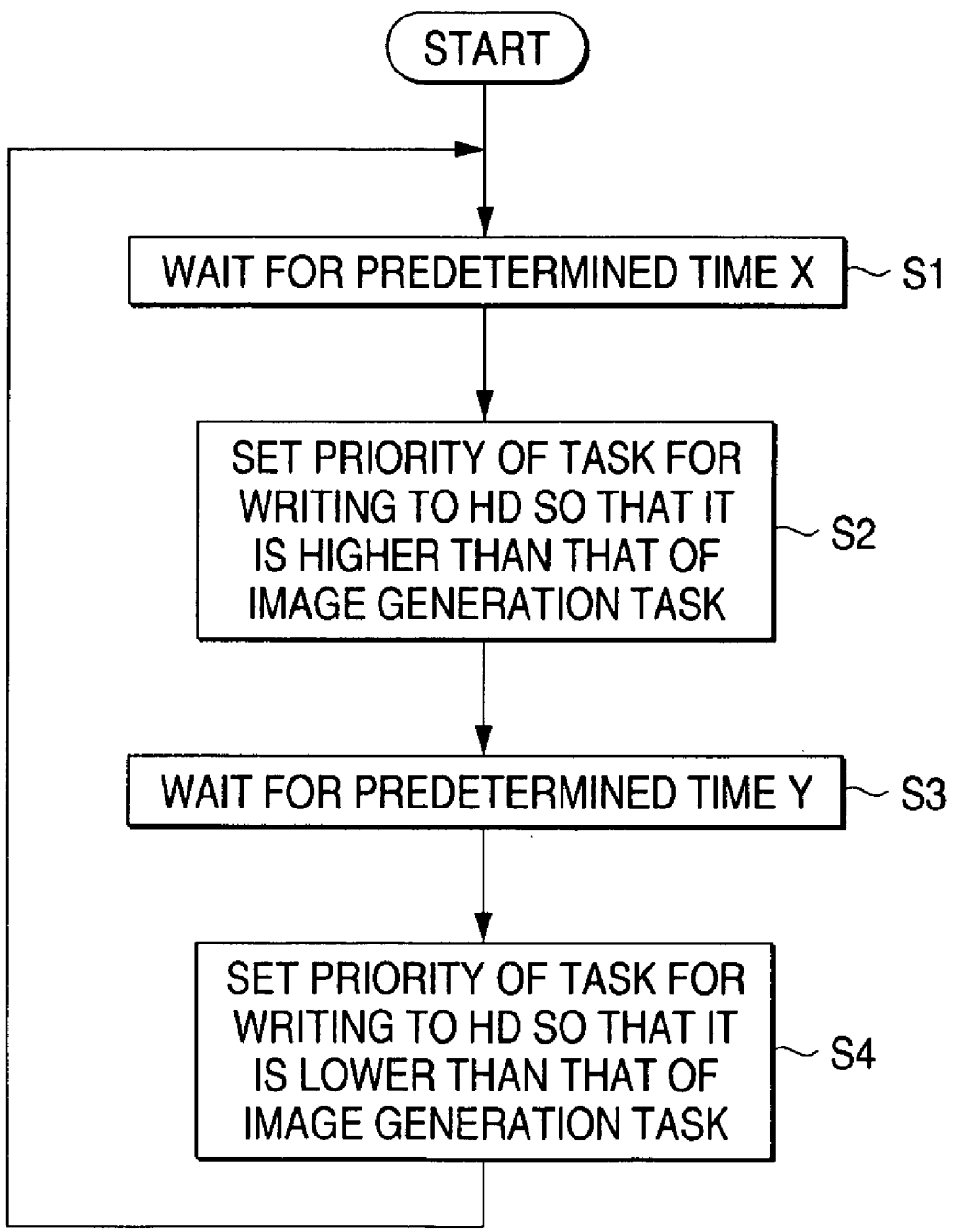
FIG. 10 is a flowchart showing a case that the priority of the task for writing to HD is periodically rewritten.

FIG. 10 is a flowchart showing a case that the priority of the task for writing to HD 12 is periodically rewritten. That is, when processing is started, first, processing waits by predetermined time X in a step S1. The above time X is approximately 10 seconds. When predetermined time X elapses, the priority of the task for writing to HD 12 is rewritten so that it is higher than the priority of the image generation task 14 in a step S2. That is, the priority changing section 19 sets so that the priority of the task for writing to HD 12 stored in the priority table 18 is lower than the priority of the image generation task 14. If the priority of the image generation task 14 is set to 146 for example, the priority of the task for writing to HD 12 is rewritten so that it is 147.

Next, processing waits by predetermined time Y in a step S3. The time Y may be set to approximately 50 seconds. When predetermined time Y elapses, the priority of the task for writing to HD 12 is set in a step S4 so that it is higher than the priority of the image generation task 14. If the priority of the image generation task 14 is set to 146 for example, the priority of the task for writing to HD 12 is rewritten so that it is 145.

Figure 11:
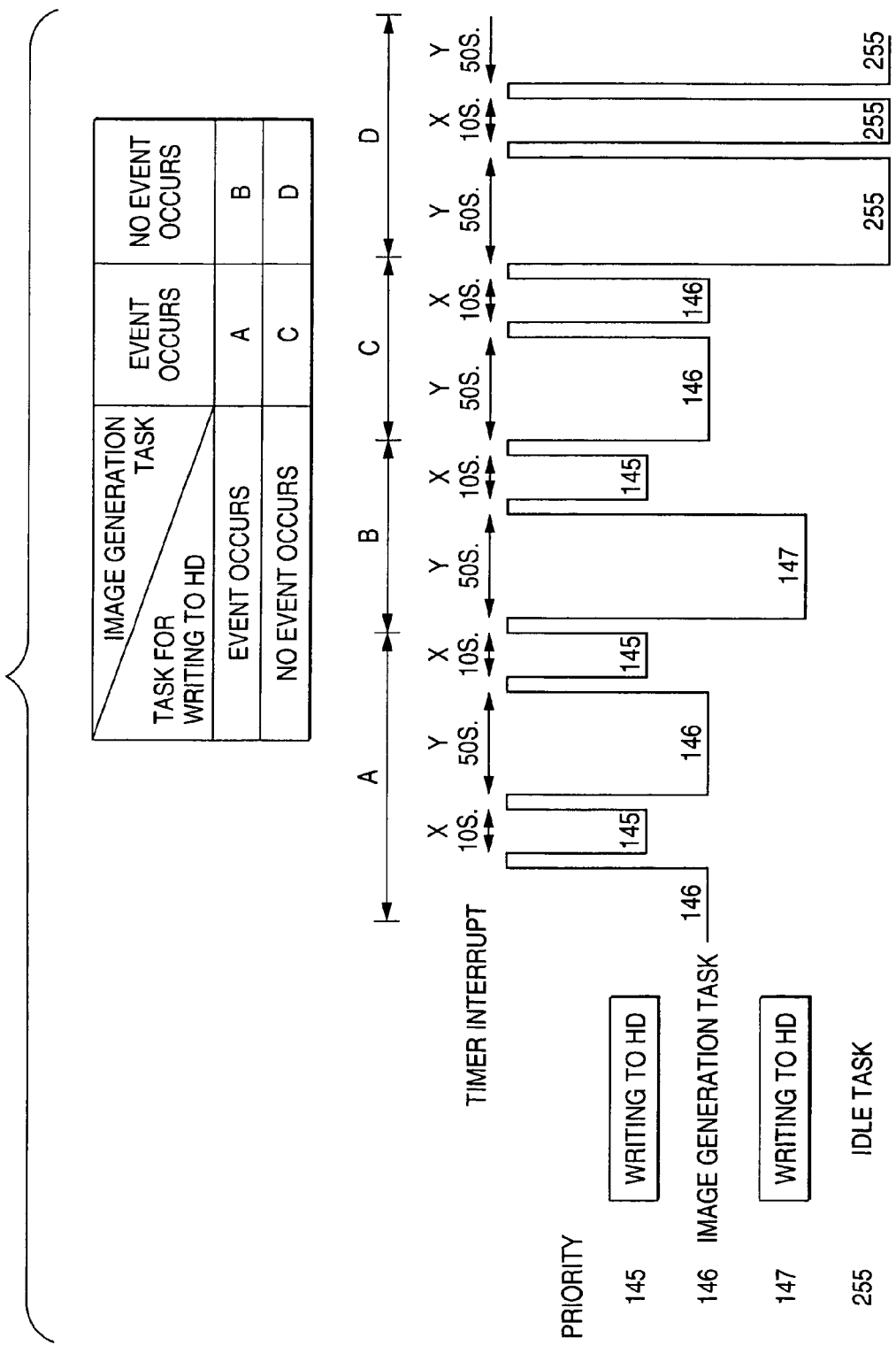
FIG. 11 is a time chart schematically showing a state in which each task is executed when the priority is rewritten.

FIG. 11 is a time chart schematically showing a state in which each task is executed when priority is rewritten as described above. That is, as shown in FIG. 11, in a predetermined period X, the priority of the task for writing to HD is set so that it is higher than the priority of the image generation task and in a predetermined period Y, the priority of the task for writing to HD is set so that it is lower than the priority of the image generation task. There is a period of timer interrupt between these periods X and Y, however, the above period is momentary time shorter than one second and is as short time as cannot be compared with the periods X and Y. In addition, when predetermined time comes, the allocation of CPU is forcedly lost.

Though the priority of the task for reading from HD is not shown in FIG. 11, it may be also changed as the task for writing to HD.

In FIG. 11, four types of typical situations A to D are shown in a horizontal direction corresponding to whether an event occurs in each task or not. These situations A to D correspond to whether an event occurs in each task or not shown in a table in FIG. 11.

First, the situation shown by a letter A in FIG. 11 shows a case that an event which the task for writing to HD should process, that is, data to be written to HD is input and an event which the image generation task should process, that is, print data is input. In this case, as the priority of the task for writing to HD is set during the period X so that it is higher than the priority of the image generation task, the allocation of CPU is transferred to the task for writing to HD and data is written to HD. Next, as the priority of the task for writing to HD is set when the period Y comes so that it is lower, the allocation of CPU is transferred to the image generation task and a job of the generation of a request for printing and others is executed in the image generation task.

Next, the situation shown by a letter B in FIG. 11 shows a case that there is an event which the task for writing to HD should process and there is no event which the image generation task should process. In this case, as the priority of the task for writing to HD is set at the beginning of the period Y so that it is low, CPU is allocated to the image generation task, however, as there is no event to be processed in the image generation task, CPU is allocated to the task for writing to HD and data is written to HD. In the succeeding period X, as the priority of the task for writing to HD is set so that it is higher than the priority of the image generation task, a state in which CPU is allocated to the task for writing to HD is kept and data is written to HD.

Next, the situation shown by a letter C in FIG. 11 shows a case that there is no event which the task for writing to HD should process and there is an event which the image generation task should process. In this case, as the priority of the task for writing to HD is set in the period Y so that it is low, CPU is allocated to the image generation task and a job of the generation of a request for printing and others is executed in the image generation task. In the succeeding period X, as there is no event to be processed in the task for writing to HD though the priority of the task for writing to HD is set so that it is higher than that of the image generation task, the allocation of CPU is transferred to the image generation task and the processing of the generation of a request for printing and others is executed.

Next, the situation shown by a letter D in FIG. 11 shows a case that there is no event to be processed both in the task for writing to HD and in the image generation task. In this case, in the periods Y and X, CPU is allocated to the idle task and a waiting state is kept.

According to the present invention, CPU can be efficiently allocated to each task by dynamically changing the priority of the task for writing to HD 12 as described above. As a result, the print engine can be efficiently operated and a host computer connected to the network can be released early.

To explain a case that the engine of a laser printer is used for the print engine as an example, it is desirable that the engine is continuously operated without stopping it possibly to realize prompt printing. The reason is that once the operation of the engine is stopped, an extra step such as the heating of a fixing head is required before the engine is next activated and the loss of time is caused. Therefore, to keep printing speed maximum, it is required that the image generation task 14 continuously outputs a request for printing to the printing task 15 so that the engine can be continuously operated.

In the meantime, to release a host computer connected to the network 100 early, it is desirable that data received by the interface 1 is promptly written to HD.

Therefore, to make prompt printing work and the prompt release of a host computer compatible, it is required that the allocation of CPU is balanced between the task for writing to HD and the image generation task. However, if the priority of the task for writing to HD is set so that it is always lower than the priority of the image generation task, the writing of data to HD is delayed and the release of the host computer is delayed.

Particularly, when the image generation task once finishes important processing of inputting print data and generating a request for printing, it is often programmed so that processing called garbage collection for example is started. The above garbage collection means processing for collecting memory areas used as if they are worm-eaten and improving the efficiency of the utilization of a work memory, however, the priority of the processing is not high so much originally. That is, if a part of time in which the image generation task should execute garbage collection is allocated to the task for writing to HD 12 and data is written to HD, a host computer in the network can be released early without reducing printing speed.

According to these inventors' own examination, particularly when the priority of the task for writing to HD for the image generation task is changed, it proves that there is a tendency that printing processing and the release of a host computer are compatible.

In this case, the priority of the task for reading from HD 13 may be also changed at the same time as the priority of the task for writing to HD is changed if necessary. However, it proves that it is desirable that the priority of the task for reading from HD 13 is higher than the priority of the task for writing to HD 12. This is because generally, speed for reading data from HD or an auxiliary storage such as an optical disk and a magneto-optic disk is faster than speed for writing to them. That is, if the priority of the task for writing to HD is set so that it is higher than the priority of the task for reading from HD, the task for reading data is started after the task for writing data the processing speed of which is slow is finished, the rate of reading processing is limited and a situation that the quantity of data stored in HD temporarily overflows may also occur.

In the meantime, as long as the priority of the task for reading from HD is set so that it is higher than the priority of the task for writing to HD, the rate of processing for reading data from HD is not limited by processing the speed of which is slow and the smoothness of processing is kept.

The case that the priority of the task for writing to HD and the image generation task is changed every predetermined time has been described above as the example.

Second Embodiment

Next, a second embodiment of the present invention will be described.

In this embodiment, the priority of each task is rewritten not every predetermined time but according to a situation of the processing of the task.

Figure 12:
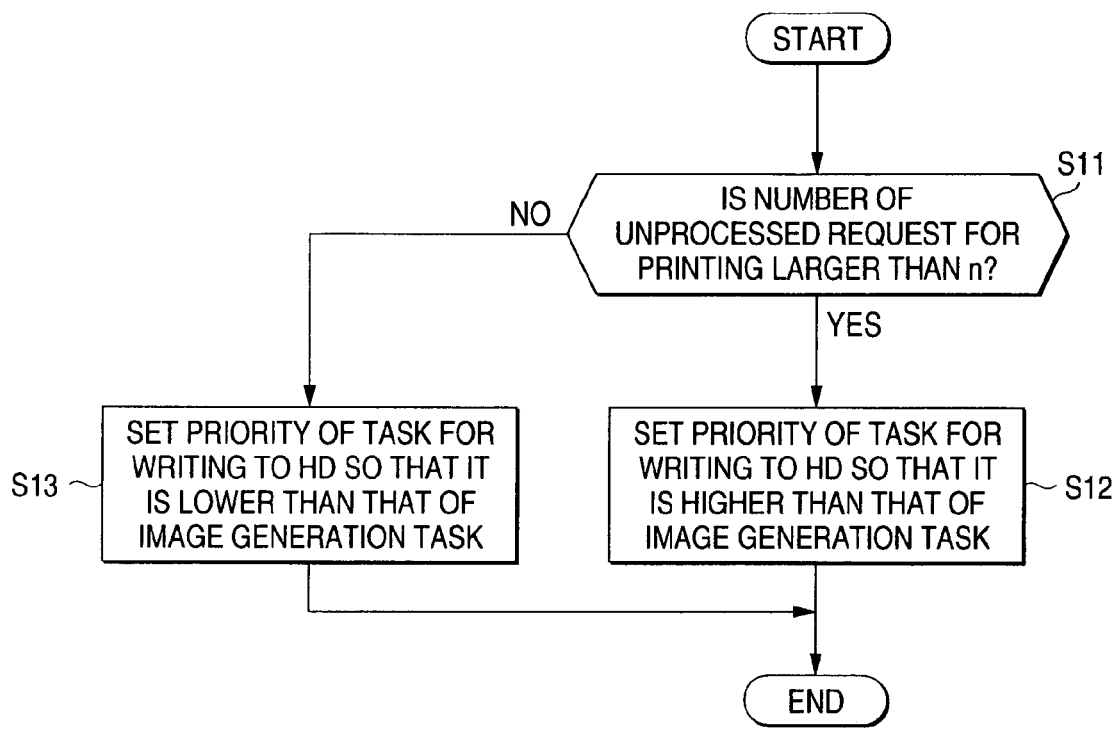
FIG. 12 is a flowchart showing processing for changing the priority of a task in a second embodiment.

FIG. 12 is a flowchart showing processing for changing the priority of a task in this embodiment. That is, in an example shown in FIG. 12, the priority of a task for writing to HD is changed according to the number of unprocessed requests for printing.

As described above in relation to FIG. 6, a printing task 15 reads a request for printing stored in a buffer 4c and executes printing. Therefore, as printing is continuously executed without stopping for a while in case the enough number of requests for printing are already stored in the buffer 4c, it is more efficient to execute processing for writing to HD and for reading from HD than to generate more requests for printing. In processing shown in FIG. 12, the number of unprocessed ones of requests for printing is first detected in a step S11 and it is determined whether the number is larger, compared with a predetermined number n or not.

If the number of the unprocessed requests for printing is larger than the predetermined number n, an image generation task is not required to generate more requests for printing hastily. Then, in a step S12, the priority of the task for writing to HD is made higher than that of the image generation task. Specifically, if the priority of the image generation task is 146 for example, the priority of the task for writing to HD is 145. This is executed by rewriting a priority table by CPU.

In the meantime, if the number of unprocessed requests for printing is smaller than the above predetermined number n, it is desirable that the image generation task continues to generate more requests for printing so as to continuously operate a print engine. Then, in a step S13, the priority of the task for writing to HD is rewritten to 147 so as to make the image generation task precede.

It is desirable that the above series of steps are repeatedly executed in accordance with the proceedings of processing in the printing task. The priority of the task for reading from HD may be also changed at the same time as the change of the priority of the task for writing to HD. However, in this case, as described above, it is desirable that the priority of the task for reading from HD is set so that it is always higher than the priority of the task for writing to HD.

Further, in addition to the above judgment, the upper limit may be also provided so that the setting of the same priority does not continue longer than fixed time.

According to this embodiment, as the priority of the task for writing to HD is changed according to the stored quantity of requests for printing generated by the image generation task, data can be efficiently written to HD without stopping the print engine. Particularly, the print engine can be further continuously operated by changing the priority according to the stored quantity of requests for printing. As a result, smooth printing, the receiving and writing of data can be balanced and a host computer can be released early without reducing printing speed.

The case that the priority of the task for writing to HD 12 is changed according to the number of unprocessed requests for printing has been described above as the example. However, the present invention is not limited to the above case. In addition, the priority of a task may be also changed according to the quantity of image data included in unprocessed requests for printing. Or the priority of the task for writing to HD 12 for a communication task 11 may be also changed according to the number of unprocessed requests for printing. For example, if speed for receiving from a network is very fast, the rate of processing for writing to HD 10 is limited and the whole processing may be also delayed. In such a case, it is efficient to make the priority of the task for writing to HD 12 higher than that of the communication task 11 and promote writing to HD.

Further, in this case, the priority of the task for reading from HD 13 may be also changed at the same time as the task for writing to HD 12. The reason is that it realizes efficient processing to promote both writing and reading to/from HD 10 so that high speed receiving by the communication task 11 can be supported.

The second embodiment of the present invention has been described above.

Third Embodiment

Next, a third embodiment of the present invention will be described.

In this embodiment, further efficient processing is realized by bypassing at least either of a task for writing to HD or a task for reading from HD according to a situation in addition to the change of the priority of a task described in the first and second embodiments.

Figure 13:
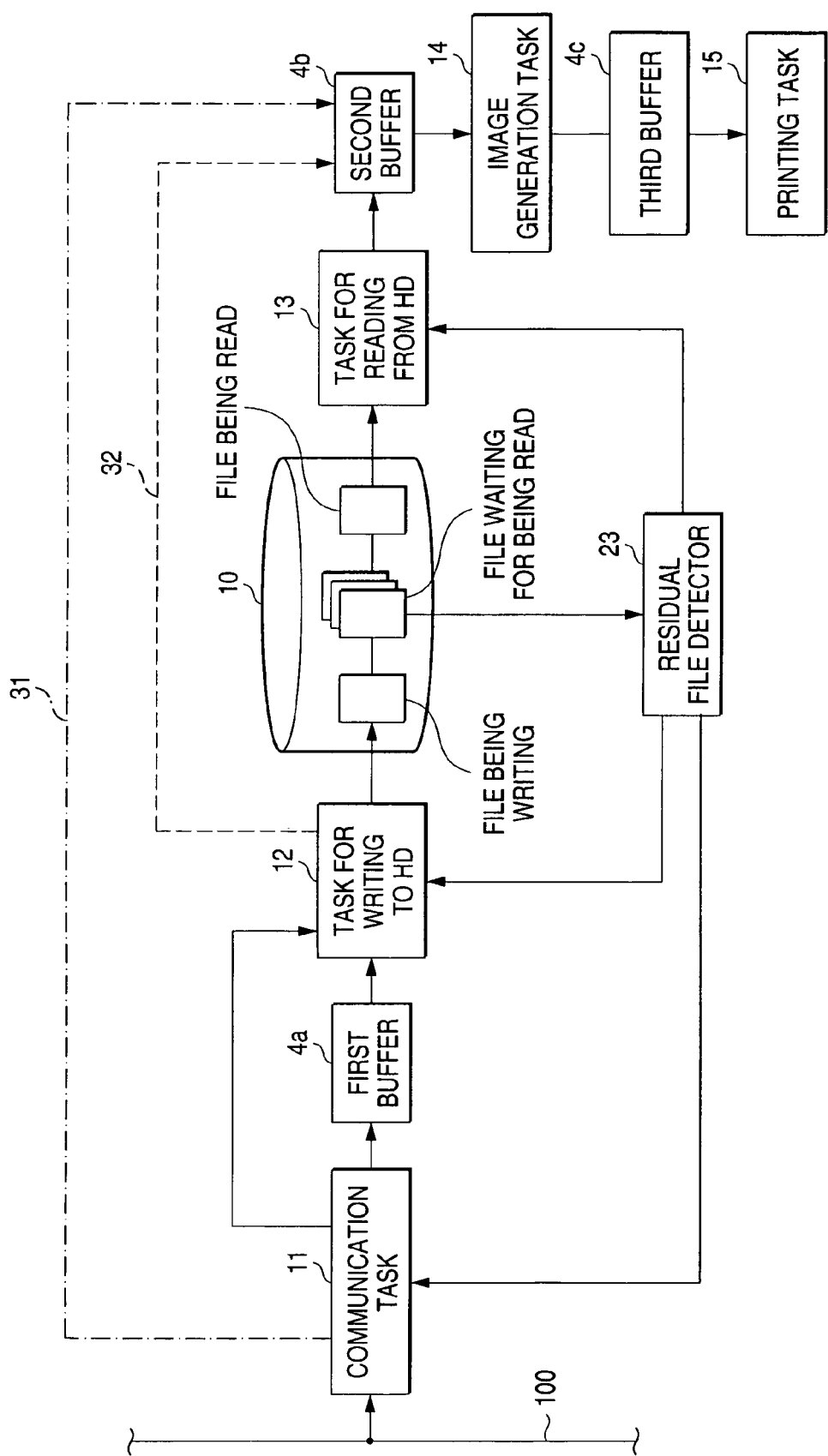
FIG. 13 is a schematic diagram showing the flow of data inside a printer equivalent to a third embodiment.

FIG. 13 is a schematic diagram showing the flow of data inside a printer equivalent to this embodiment. In this embodiment, as shown in FIG. 13, a first bypass line 31 and a second bypass line 32 are provided. As for the first bypass line 31, a task for writing to HD 12, HD 10 and a task for reading from HD 13 are skipped and data is directly transferred to a second buffer 4b from a communication task 11. As for the second bypass line 32, HD is skipped and data is directly transferred to the second buffer 4b from the task for writing to HD 12.

In the above configuration, in a normal mode (in a mode via an auxiliary storage) in which no bypass line is passed, received data is stored in HD 10 via the communication task 11, a first buffer memory 4a and the task for writing to HD 12 and the data is input to an image generation task 14 via the task for reading from HD 13 and the second buffer memory 4b.

Figure 14:
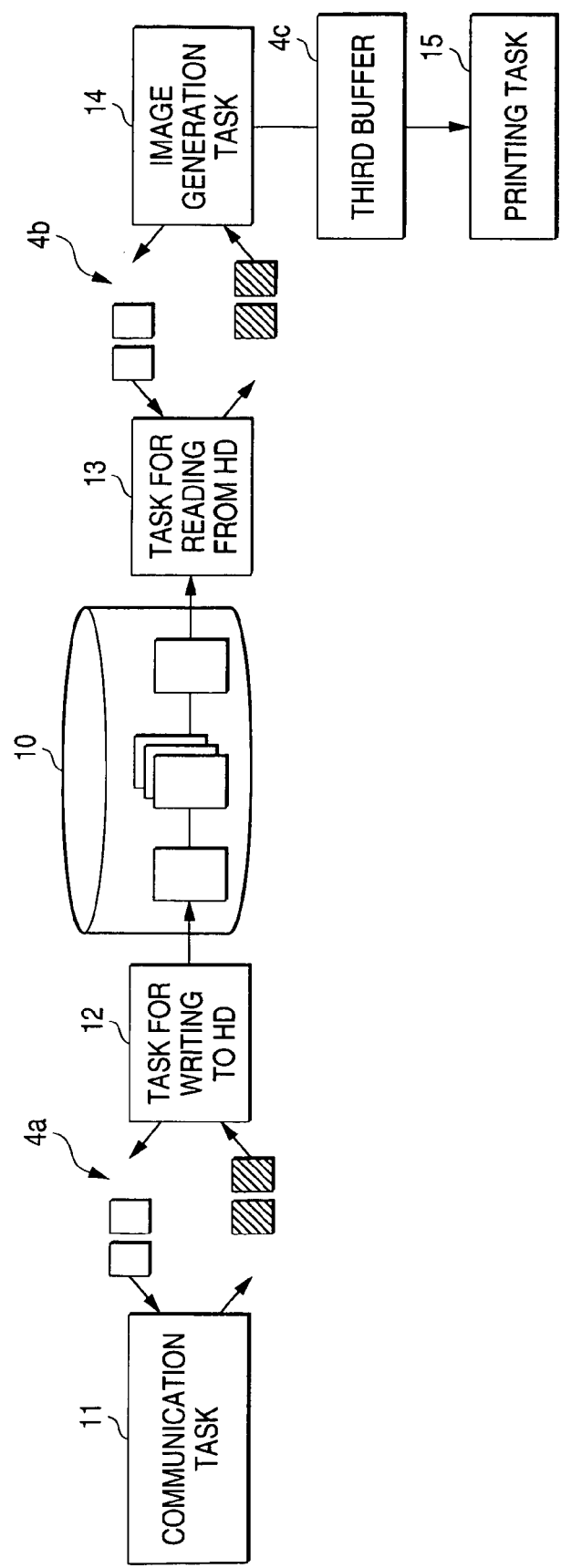
FIG. 14 is a schematic diagram showing the flow of data in a normal mode.

FIG. 14 is a schematic diagram showing the flow of data in the normal mode. In this process, as in the above first or second embodiment, the priority of the task for writing to HD 12 for the image generation task 14 is changed. Hereby, in the normal mode, printing is promptly executed and a host computer can be released early. Particularly, in the normal mode, if mass data is sent via a network, effect is produced. Recently, the throughput of a computer is enhanced, the performance of a peripheral device such as an image input device is enhanced or a large-scale network is developed, and the huge increase of print data and the increase of a load upon the printer rapidly advance. Therefore, it is extremely effective to efficiently store print data in a mass auxiliary storage in such a normal mode.

Figure 15:
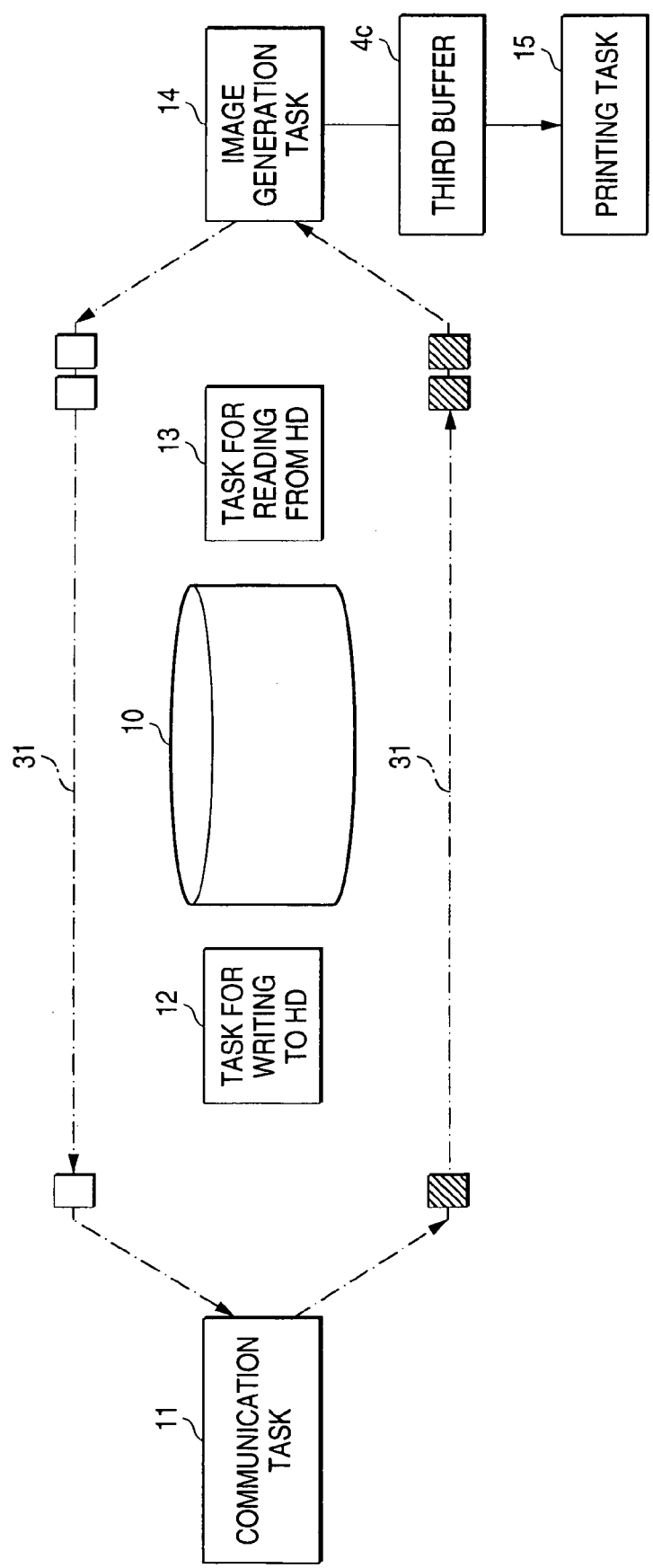
FIG. 15 is a schematic diagram showing the flow of data in a first bypass mode.

FIG. 15 is a schematic diagram showing the flow of data in a first bypass mode via the first bypass line. In this mode, as received data is directly stored in a memory block of the second buffer memory, the processing of the task for writing to HD 12 and the task for reading from HD 13 is omitted and data can be promptly input to the image generation task 14.

Figure 16:
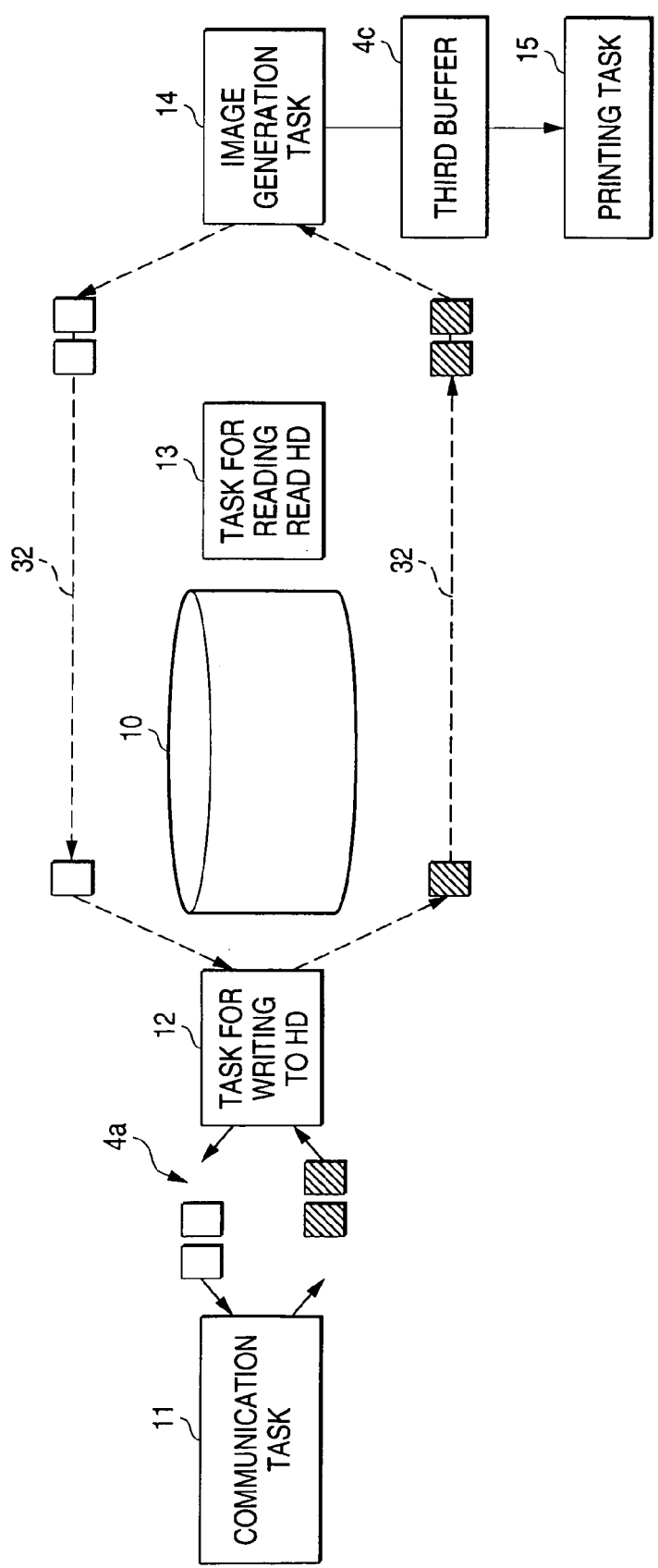
FIG. 16 is a schematic diagram showing the flow of data in a second bypass mode.

FIG. 16 is a schematic diagram showing the flow of data in a second bypass mode via the second bypass line. In this mode, as the task for writing to HD 12 stores data in a memory block of the second buffer memory 4b in place of writing data to HD 10, data can be promptly transferred to the image generation task 14.

Figure 17A:
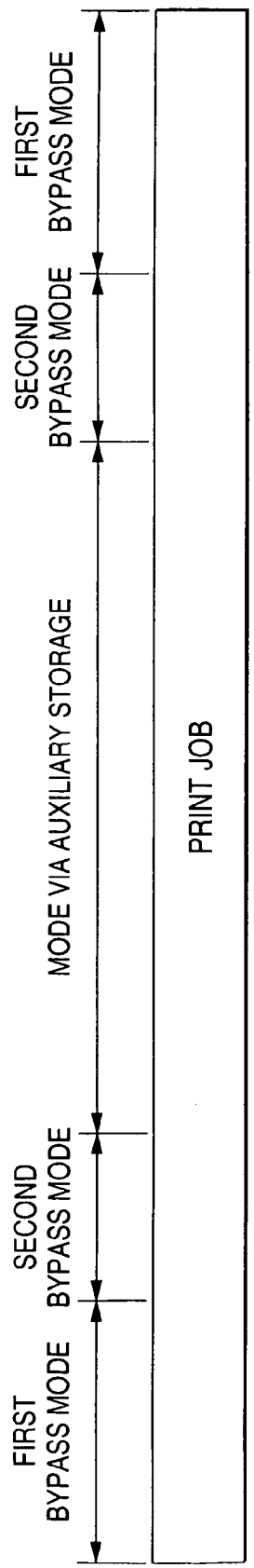
FIGS. 17A and 17B are explanatory drawings showing a state in which a transfer mode is switched.
Figure 17B:
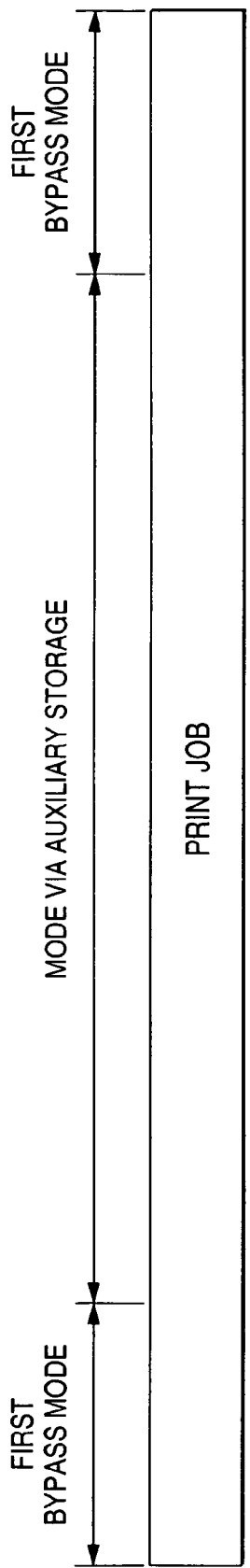

FIGS. 17A and 17B are schematic diagrams showing the appearance of the change of a transfer mode caused when one print job is transferred.

For example, as shown in FIG. 17A, at the beginning of the receiving of a print job, transfer is performed in the first bypass mode. Then, when the communication task 11 uses up a memory block of the second buffer memory 4b, received data is stored in a memory block of the first buffer memory 4a. While the communication task 11 uses the first buffer memory 4a, the image generation task 14 receives a memory block not empty from the second buffer memory 4b and generates a request for printing. As described above, when a full memory block occurs in the first buffer memory 4a under a situation that no residual file exists (as determined by the residual file detector 23) in HD 10, the first bypass mode is switched to the second bypass mode by the task for writing to HD 12. In the second bypass mode, the task for writing to HD stores data in a memory block of the second buffer memory 4b. When there is no empty memory block in the second buffer memory 4b by switching to the second bypass mode, the second bypass mode is switched to the mode via the auxiliary storage (the normal mode) and data is input to the image generation task 14 via HD 10. In the normal mode, the priority of the task for writing to HD) 12 for the image generation task 14 is changed as in the first or second embodiment.

Therefore, according to this embodiment, high speed data transfer in the first and second bypass modes is performed immediately after a print job is received, the first and second bypass modes are switched to the normal mode in the vicinity of the middle of the print job and in this step, smooth printing and the early release of a host computer are also compatible. As all files in HD 10 are read around the end of the print job, the normal mode is switched to the second bypass mode. Then, the second bypass mode is switched to the first bypass mode.

In this embodiment, in all print jobs, mode switching shown in FIG. 17A is not performed. A situation of mode switching also changes according to the change of various parameters such as speed for receiving a packet, the quantity of data included in a print job and the processing speed of the image generation task 14.

For example, as shown in FIG. 17B, a case that the first bypass mode is switched to the mode via the auxiliary storage (the normal mode) is also conceivable. In this case, smooth processing is also realized by dynamically changing the priority of a task in the normal mode.

Referring to the concrete drawings, the embodiments of the present invention are described above. However, the present invention is not limited to these concrete examples.

For example, in the above each concrete example, the case that the priority is changed according to timer interrupt or the number of unprocessed requests for printing is shown, however, in addition, the priority of the task for writing to HD may be also changed according to a situation of the processing of any task. That is, according to the present invention, as a result, the relative priority of the task for writing to HD for another task has only to be changed.

Therefore, for example, the priority of the image generation task or another task may be also rewritten in place of changing the priority of the task for writing to HD or at the same time as it.

The above case that print data received from the network 100 is stored in HD 10 is given as the example, however, in addition, for example, a request for printing generated by the image generation task may be also stored in HD 10. In this case, the request for printing generated by the image generation task 14 is stored in HD 10 by the task for writing to HD 12. Data read by the task for reading from HD 13 is transferred to a printing task 15.

As the quantity of data included in a request for printing is particularly much of data generated by the image generation task, it is efficient to store the request for printing in HD. However, when the image generation task sequentially continues to generate a large quantity of requests for printing in such configuration, receiving a large quantity of print data via the network, the writing of data to HD does not catch up and a situation that the transfer of data is delayed may occur. In such a case, if the priority of the task for writing to HD is suitably set so that it is higher than the priority of the image generation task, the transfer of a request for printing to HD is secured and the processing of the whole printer can be smoothly executed.

In the meantime, in the present invention, various recording devices not limited to HD using a record medium such as an optical record medium and a magneto-optic record medium can be used for the auxiliary storage. That is, if a recording device the speed for writing data of which is slower than a conventional type buffer memory, that is, RAM is used for the auxiliary storage, the present invention is similarly applied and the similar effect can be acquired.

In the meantime, the size of a memory block which is the unit of the use of each buffer memory can be changed according to a state in which data is processed. For example, the size of a memory block can be also set to a fixed value of approximately 100 kB and block size can be also changed according to a data processing rate inside the printer. The size of a memory block of each buffer memory is not necessarily required to be equal and may be also different. However, if block size is the same, it is convenient in view of data transfer.

Further, the printer according to the present invention is not limited to a printer dedicated device and may be also a compound device provided with another function such as a copying machine and a facsimile.

In addition, this trade can add and change variously in the range of the summary of the present invention disclosed in this specification.

The present invention is embodied in the above embodiments and the following effect is produced.

First, according to the first embodiment of the present invention, if data is written to HD, a host computer in a network can be released early without reducing printing speed by changing the priority of the task for writing to HD by timer interrupt.

Particularly, the balance of plural tasks can be improved by allocating a part of processing time such as garbage collection by the image generation task to the task for writing to HD.

Also, according to the second embodiment of the present invention, as the priority of the task for writing to HD is changed according to a situation such as the stored quantity of requests for printing generated by the image generation task, data can be efficiently written to HD without stopping the print engine. Particularly, the continuous operation of the print engine can be secured by changing the priority according to the stored quantity of requests for printing. As a result, smooth printing, the smooth receiving of data and smooth writing can be balanced and a host computer can be released early without reducing printing speed.

The effect produced by the present invention is particularly remarkable in case the engine of a laser printer is used. That is, it is desirable that the laser printer is continuously operated without stopping the engine possibly so as to realize prompt printing, however, according to the present invention, the priority of the task for writing to HD is adjusted, storing requests for printing so that the engine can be continuously operated.

In the meantime, according to the third embodiment of the present invention, as the bypass lines are further provided and the normal mode via HD and the bypass mode for bypassing HD are switched according to a state in which data is processed, processing time can be more greatly reduced than that in case the whole print job is stored in HD. Simultaneously in the normal mode, efficient processing is enabled by dynamically adjusting the priority of a task as in the first or second embodiment. As a result, further high speed processing by the bypass mode is enabled in addition to prompt printing in the normal mode and the release of a host computer and the usability of the printer is further improved.

Further, according to the above each embodiment of the present invention, the processing speed of the whole printer can be enhanced without using a high-priced high speed interface, DMA and others.

As described in detail above, according to the present invention, the printer the cost of which is low and which is extremely usable can be provided and industrial merits are great.

What is claimed is:

1. A printer control method, comprising:
    a writing process for storing print data received from an external device in an auxiliary storage;
    a reading process for reading print data written to said auxiliary storage;
    a generation process for generating a request for printing based upon said read print data; and
    a printing process for printing based upon said request for printing,
    wherein a plurality of print data is received from the external device so that a plurality of writing processes, reading processes, generation processes, and printing processes are created and repeatedly executed, wherein each of said plurality of print data includes a writing process, a reading process, a generation process and a printing process,
    wherein unexecuted writing processes are controlled to be precedently executed by a CPU in case a stored quantity of unprocessed requests for printing generated by an execution of said generation process by said CPU is equal to or more than a predetermined quantity.

2. A computer readable medium containing a program for instructing a processor to perform operations, comprising:
    a writing process for storing print data received from an external device in an auxiliary storage;
    a reading process for reading print data written to said auxiliary storage;
    a generating process for generating a request for printing based upon said read print data; and
    printing process for printing based upon said request for printing, wherein a plurality of print data is received from the external device so that a plurality of writing processes, reading processes, generation processes, and printing processes are created and repeatedly executed, wherein each of said plurality of print data includes a writing process a reading process, a generating process and a printing process, wherein unexecuted writing processes are controlled to be precedently executed by a CPU in case a stored quantity of unprocessed requests for printing generated by an execution of said generation process by said CPU is equal to or more than a predetermined quantity.

3. A printer, comprising:

writing means for writing print data received from an external device into an auxiliary storage;

reading means for reading print data written to said auxiliary storage;

generating means for generating a request for printing based upon said read print data; and printing means for printing based upon said request for printing, wherein a plurality of print data is received from the external device so that a plurality of writing processes, reading processes, generation processes, and printing processes are created and repeatedly executed, wherein each of said plurality of print data includes a writing process, a reading process, a generating process and a printing process, wherein unexecuted writing processes are precedently executed by a CPU in case a stored quantity of unprocessed requests for printing generated by an execution of said generating means by said CPU is equal to or more than a predetermined quantity.

* * * * *